July 25, 1944. E. H. WILLETTS 2,354,344
TRAILER
Filed March 23, 1942 3 Sheets-Sheet 1
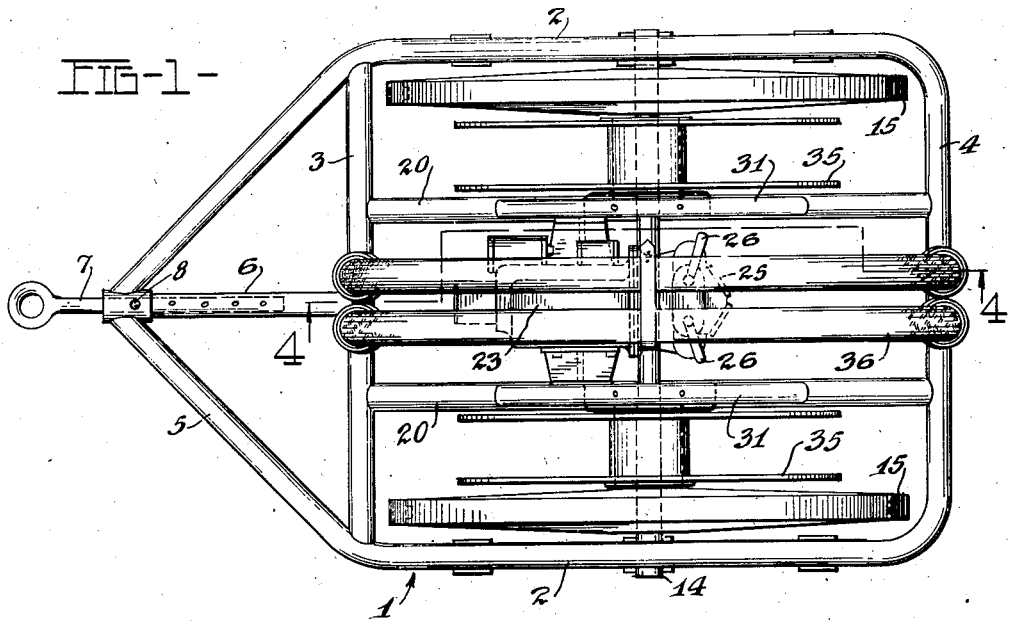
Fig-1-
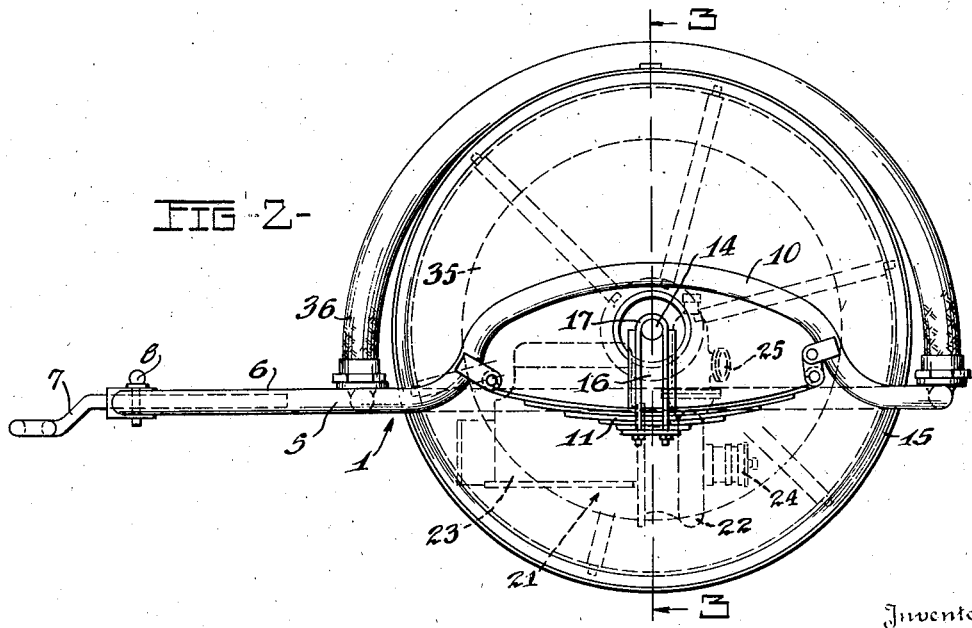
Fig-2-
Inventor
ELWOOD H. WILLETTS
By
Attorneys

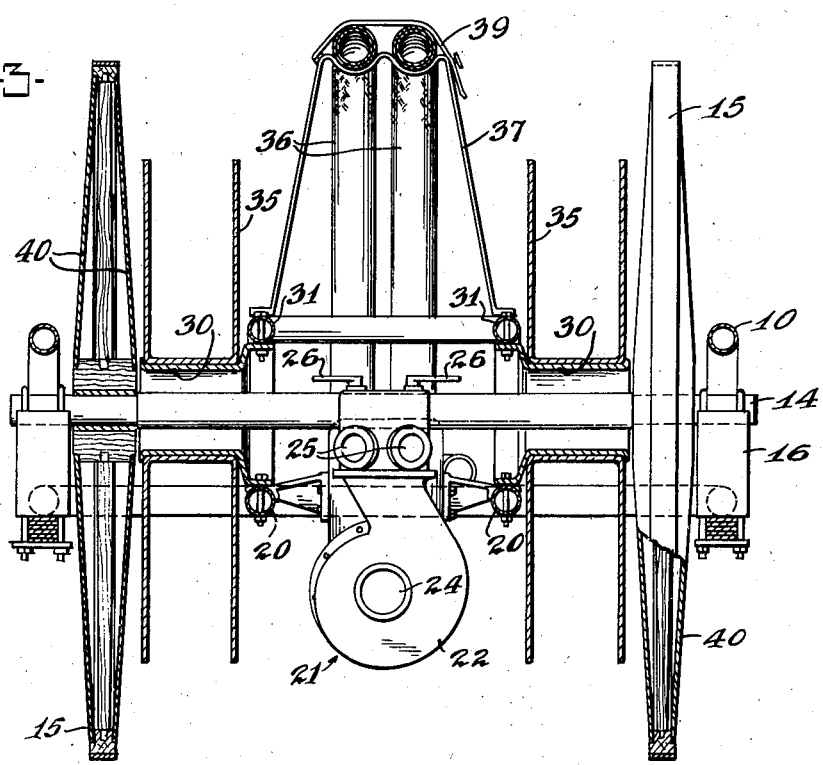
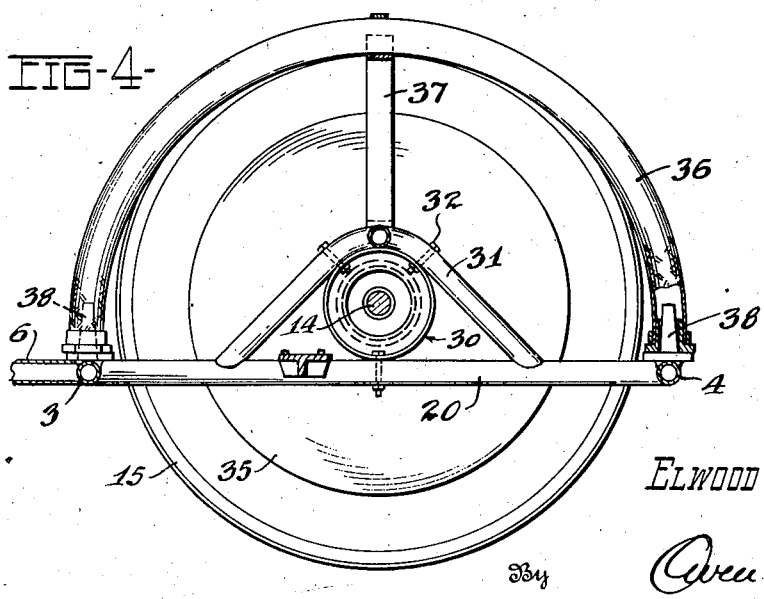

July 25, 1944.  E. H. WILLETTS  2,354,344
TRAILER
Filed March 23, 1942   3 Sheets-Sheet 3
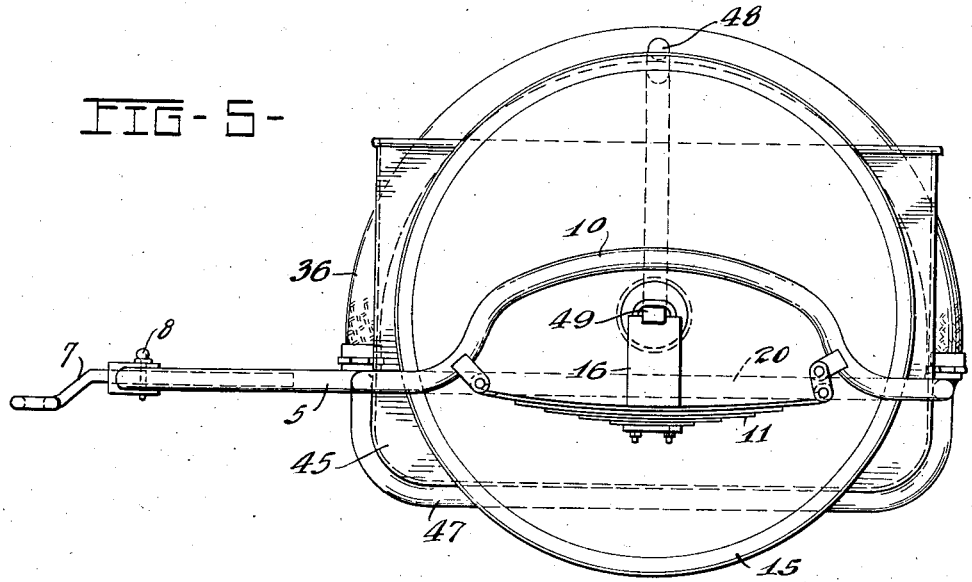
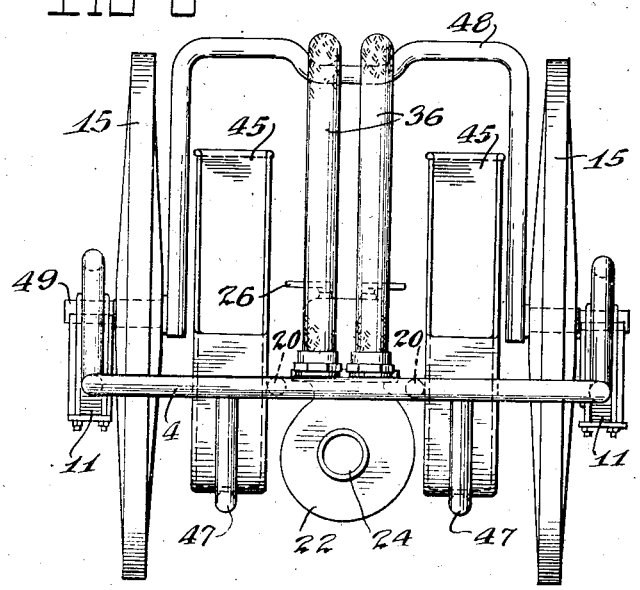
Inventor
ELWOOD H. WILLETTS
By Owen & Owen
Attorneys Patented July 25, 1944

2,354,344

UNITED STATES PATENT OFFICE 2,354,344

TRAILER

Elwood H. Willetts, Toledo, Ohio, assignor, by mesne assignments, to Willys-Overland Motors, Inc., Toledo, Ohio, a corporation of Delaware Application March 23, 1942, Serial No. 435,856

11 Claims. (Cl. 169—24)

This invention relates primarily to trailers, and more particularly to a trailer or truck adapted to carry an engine and pump assembly, together with hose equipment, for use in the fighting of fires occurring from air raids or otherwise.

An object of the invention is the provision of a strong, durable and inexpensive vehicle of the class described, preferably of the two-wheel type, which has a novel arrangement of parts, is comparatively light in construction, and which, when equipped, has its center of gravity below the axis of the wheels to facilitate rapid turning movements without lateral tipping and to prevent longitudinal tipping when uncoupled from a towing vehicle and being handled by manpower.

Further objects and advantages of the invention will be apparent from the following detailed description thereof and from the accompanying drawings illustrating two embodiments of the invention, and in which—

Figures 1 and 2 are top plan and side elevations, respectively, of a device embodying the invention; Fig. 3 is a section on the line 3—3 in Fig. 2, with parts in full; Fig. 4 is a section on the line 4—4 in Fig. 1, with parts broken away; Fig. 5 is a side elevation of a modified form of the invention, and Fig. 6 is a rear end elevation thereof, with parts broken away.

Referring to the drawings, and particularly to the form of the invention shown in Figs. 1 to 4, 1 designates the body frame, which, in the present instance, is composed of tubular stock, and is of rectangular form, with the opposing sides 2, 2, the front and rear side members 3 and 4, respectively, and the front extension 5, all rigidly connected together. To form the extension 5, the sides 2 are continued forwardly beyond the front cross-piece 3 in converging relation to meet in the longitudinal center line of the frame and form a triangle with said cross-piece. A tubular center piece 6 is disposed longitudinally of said extension, being connected at its forward end to the apex portion thereof and at its rear end to the cross-piece 3 centrally of its ends. The shank of a draft member 7 is adjustably secured in the front open end of the center piece 6 by a pin 8.

Each frame side 2 intermediate its ends is provided with an upward bow 10 to the forward and rear leg portions of which are connected the respective ends of a downwardly bowed leaf spring assembly 11, one end connection including a shackle to permit lengthwise movement of the spring, as well understood in the art.

An axle 14 is supported near its ends within the frame 1 by a pair of wheels 15, 15, and the frame is suspended at each side from the respective axle end by the bowed spring 11 and intermediate spacing connection 16 disposed at the center of and rising from the spring. The axle is tied to the spring through the spacing connection by an inverted U bolt 17. The axle ends are disposed within the upper portions of the spaces formed by the frame bows 10, as best shown in Fig. 2, and the wheels are preferably disposed inwardly of the frame side for the purpose of protection.

A pair of frame bears 20, 20, are disposed lengthwise of the frame in the general plane thereof, and are attached at their ends by welding, or in any other suitable manner, to the respective front and rear cross members 3 and 4. These bars are parallel and outwardly spaced a distance from each side of the longitudinal center of the frame and have an engine driven pump unit 21 suspended therefrom beneath the axle 10. This unit, in the present instance, includes a pump 22 and operating motor 23 therefor. The pump is shown in Fig. 3 as having an inlet opening 24 and two outlet openings 25 controlled by separate valves operated by handles 26.

A hollow journal 30 is mounted around the axle in spaced floating relation thereto at the inner side of each wheel 15 and adjacent thereto. The inner end of each journal is radially enlarged and rests on and is secured to the adjacent frame bar 20 and is braced relative to such bar by an inverted V-form of frame bar 31 which extends over the top of the journal enlargement, to which it is fixed by bolts 32 or in any other suitable manner, and has its ends fixedly attached to the adjacent frame bar 20, as best shown in Fig. 4. It is apparent that in this manner the journals 30 are fixedly carried by the spring cushioned frame 1 intermediate the wheels 15 for floating movements relative to the axle 14.

A reel 35 for a discharge hose (not shown) is mounted on each journal 30 for turning movements relative thereto and each hose, when taken from its reel, may have its inlet end connected to one of the outlets 25 of the pump. A suction hose 36, for connecting the pump inlet 24 to any suitable source of water supply, may be carried by the trailer by looping it over the trailer in a vertical plane longitudinally of the frame and intermediate the reels 35, with its central portion supported by a bracket member 37 rising from and connecting the tops of the two brace bars 31, and with its ends detachably connected to the respective front and rear frame bars 3 and 4, as for instance by being inserted over lug members 38 on the frame. The upper central portion of the suction hose may be held in engagement with a seat on the top portion of the bracket 37 by a releasable strap means 39. In the present instance, the trailer is shown as carrying two suction hose 36, so that one may be used as a spare, or may be attached to the other to effect a lengthening thereof.

It is apparent that when the truck arrives at a point of use, the suction hose 36 may be quickly disconnected from the trailer frame and connected to the inlet opening of the pump and a suitable source of water supply, while either or both of the discharge hose may be unreeled and used for discharging water from the pump to a desired point of use for extinguishing fire or for other purposes.

While the wheels 15 may be of any suitable construction, they are shown, in the present instance, as being of wood type for the purpose of saving metal, each having its hub, spokes and felly of wood with a metal rim around the felly and with side disks 40 of thin laminated wood stock, or the like, enclosing the spokes, as shown in Fig. 3.

In the form of the invention shown in Figs. 5 and 6, the truck is adapted for carrying open top boxes or receptacles 45 at each side of the pump unit into each of which a discharge hose may be looped backward and forward for storing when not in use, and which boxes may also serve as receptacles for carrying any other loose equipment. These boxes take the place of the reels 35 in the first described form and extend at their bottoms below the frame 1, being supported at their bottoms by U-shaped frame bars 47, 47, extending below and connecting the front and rear cross-bars of the frame. The inner side of each box may bear against and be fixedly connected in any suitable manner to the respective frame bar 20. In this form of the invention the axle, which is designated 48, may be bowed upwardly intermediate the wheels, so as to pass over the boxes 45 instead of passing therethrough as in the case of the reels 35, and such axle at its ends is provided with stubs 49 for forming journals for the wheels and from the outer ends of which the frame is suspended in the same manner as described in connection with the first form. Apart from the form of the axle 48 and the provision of the boxes 45 and the supporting frame bars 47 therefor, the trailer construction and the mounting of the equipment thereon is the same as that of the first described form.

It is apparent that in either form of the invention the trailer frame is of light, strong, durable and simple construction, and is yieldingly suspended relative to the axle with its center of gravity, including that of the equipment, disposed below the axis of the wheels, to provide a suspended construction which is laterally and longitudinally stable.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a vehicle of the class described wherein an axle is supported by spaced wheels, a frame carried by the axle, a journal carried by the frame in spaced encircling relation to the axle for floating movements relative thereto, and a hose reel rotatably mounted on said journal.

2. In a vehicle of the class described wherein an axle is supported by spaced wheels, a frame carried by the axle and disposed in underslung relation to the axis of the wheels, a journal carried by the frame in spaced encircling relation to the axle for floating movements relative thereto, a hose reel rotatably mounted on said axle, and a pump unit carried by the frame intermediate the wheels and capable of having its discharge outlet connected to a hose on the reel, the center of gravity of said parts being below the axis of the wheels.

3. In a vehicle of the class described wherein an axle is supported by spaced wheels, a frame carried by the axle and disposed in underslung relation to the axis of the wheels, a journal carried by the frame at each side of its center in spaced encircling relation to the axle for floating movements relative thereto, bracing means connecting the inner ends of said journals and frame, and a reel rotatably mounted on each journal.

4. In a vehicle of the class described, a frame having side bars, front and rear cross-bars and intermediate bars connecting the front and rear bars, said side bars being upwardly bowed intermediate their ends, an axle extending at its ends within the spaces formed by said bows, supporting wheels mounted on the axle within the frame adjacent to each side bar, resilient means connecting the axle to said side bars within the bowed portion thereof for suspending the frame at each side from the axle, and equipment carrying means mounted on the frame between the wheels, the center of gravity of said frame and means being below the axis of the wheels.

5. In a vehicle of the class described, a frame having side bars, front and rear cross-bars, and intermediate bars connecting the front and rear bars, an axle disposed over said frame crosswise thereof intermediate said front and rear bars, supporting wheels mounted on said axle within said frame adjacent to each of said side bars, means connecting the axle ends and side bars of the frame to suspend the frame from the axle, a journal mounted on and projecting outward from each of said intermediate bars in spaced encircling relation to the axle for floating movements relative thereto, a hose reel rotatably carried by each journal, and a pump unit carried by and between said intermediate frame bars, the center of gravity of said parts being below the axis of said wheels.

6. In a vehicle of the class described, a generally flat frame of rectangular form having opposing side bars, front and rear cross-bars connecting said side bars, intermediate bars connecting said front and rear bars and a forward extension, said side and intermediate bars forming spaces therebetween, journals fixedly mounted at their inner ends on said intermediate bars and projecting outwardly therefrom over said frame spaces, a reel mounted on each journal and projecting down through the subjacent frame space, an axle projecting through said journals in spaced floating relation thereto, a wheel mounted on the axle at the outer end of each journal and within the adjacent side of the frame, and means at each side of the frame suspending it from the adjacent axle end.

7. In a vehicle of the class described, a generally flat frame having opposing side bars, front and rear cross-bars and spaced intermediate bars connecting said front and rear bars, said side bars having upwardly bowed portions, an axle extending crosswise above said frame with its ends projecting within the spaces formed by said bowed portions, wheels supporting said axle within the frame adjacent to each side bar, means yieldingly connecting each end of the axle to the respective side bar to suspend the frame from the axle, and a pump unit mounted between and secured to said intermediate bars, said frame and pump unit having their centers of gravity below the axis of the wheels.

8. In a vehicle of the class described, a generally flat frame having opposing side bars, front and rear cross-bars and intermediate bars connecting said front and rear bars, said side bars having bowed portions, an axle extending crosswise relative to said frame with its ends projecting within the spaces formed by said bowed portions, wheels supporting said axle within the frame adjacent to each side bar, means yieldingly connecting each end of the axle to the respective side bar to suspend the frame from the axle, and a pump unit mounted between and secured to said intermediate bars, the center of gravity of the entire assembly being below the axis of the wheels.

9. In a vehicle of the class described, a generally flat frame having opposing side bars each with an upwardly bowed portion, an axle extending crosswise above the general flat plane of the frame with its ends projected into the spaces within the bowed portions of the respective side bars, wheels located within the frame and supporting said axle, and means suspending the frame from the axle including a leaf spring assembly spanning the bowed portion of each bar in the vertical plane thereof and suspended centrally therefrom and connected at its ends to the side bar at adjacent ends of the bowed portion whereby the frame is maintained in relatively fixed horizontal relationship with respect to the axle with its center of gravity below the axle.

10. In a vehicle of the class described, a frame having side bars, front and rear cross bars and intermediate bars connecting the front and rear bars, said side bars being upwardly bowed intermediate their ends and said intermediate bars being downwardly bowed intermediate said front and rear bars, an axle extending across and spaced above said intermediate bars and projecting at its ends under the bowed portions of the respective side bars in spaced relation thereto, a supporting wheel mounted on the axle near each end, resilient means connecting the axle to said side bars within the bowed portions thereof for suspending the frame at each side from the axle, the frame being adapted to carry equipment between the wheels with the center of gravity of the frame and equipment below the axis of the wheels.

11. A combination as called for in claim 10, wherein the axle is upwardly bowed intermediate the wheel mounting ends thereof and forms an elevated part for cooperating with the frame to support equipment and to provide a free equipment receiving space between the elevated axle part and the downwardly bowed intermediate bars for receiving equipment.

ELWOOD H. WILLETTS.